(12) United States Patent
Park et al.

(10) Patent No.: US 11,455,147 B2
(45) Date of Patent: Sep. 27, 2022

(54) SYSTEM FOR CODING WITHOUT COMPILATION AND A MODULE ASSEMBLY

(71) Applicant: LUXROBO CO., LTD., Seoul (KR)

(72) Inventors: Huijae Park, Seoul (KR); Yoonsang Jung, Seoul (KR); Seungbae Son, Seoul (KR)

(73) Assignee: LUXROBO CO., LTD., Seoul (KR)

( * ) Notice: Subject to any disclaimer, the term of this patent is extended or adjusted under 35 U.S.C. 154(b) by 0 days.

(21) Appl. No.: 16/992,372

(22) Filed: Aug. 13, 2020

(65) Prior Publication Data

US 2021/0200516 A1 Jul. 1, 2021

(30) Foreign Application Priority Data

Dec. 26, 2019 (KR) .................. 10-2019-0175319

(51) Int. Cl.
*G06F 8/30* (2018.01)
(52) U.S. Cl.
CPC ...................... *G06F 8/30* (2013.01)
(58) Field of Classification Search
CPC ........................................................ G06F 8/30
USPC ........................................................ 717/106
See application file for complete search history.

(56) References Cited

U.S. PATENT DOCUMENTS

2016/0373527 A1* 12/2016 Illowsky et al. .......... G06F 8/30
2020/0259788 A1* 8/2020 Lukiyan et al. .......... G06F 8/30

* cited by examiner

*Primary Examiner* — Wei Y Zhen
*Assistant Examiner* — Mohammed N Huda
(74) *Attorney, Agent, or Firm* — Birch, Stewart, Kolasch & Birch, LLP (57) ABSTRACT

A system for coding without compilation includes: a module assembly connected to a user terminal and a function information providing server through a network and including a plurality of modules; and a function information providing server including a function information reception unit receiving function information from the plurality of modules, a function action order generation unit generating a total sequence for a function action order based on the function information, and a function action information transmission unit transferring a command word to the module based on the function action order, in which the command word includes at least one of unique information of a next module relayed next to the module which operates based on the function action order and function number type function information to be executed in the next module, and the command word is sequentially transferred to the module relayed based on the function action order.

22 Claims, 8 Drawing Sheets

SYSTEM FOR CODING WITHOUT COMPILATION AND A MODULE ASSEMBLY

CROSS-REFERENCE TO RELATED APPLICATIONS

This application claims priority to and the benefit of Korean Patent Application No. 10-2019-0175319 filed in the Korean Intellectual Property Office on Dec. 26, 2019, the entire contents of which are incorporated herein by reference.

TECHNICAL FIELD

The present invention relates to a system for coding without compilation and a module assembly, and more particularly, to a system for coding without compilation, which is capable of simplifying an operation and maximizing efficiency by skipping a compilation process so that a module assembly can perform a relay operation based on a function operation order, and a module assembly.

BACKGROUND ART

In recent years, various module based fabricating tools for education, hobby, research, production, etc., have been proposed. Modules included in the fabricating tools may perform specific functions, respectively and are provided to be connected to each other to form a module assembly. In this case, respective modules may be provided to be also electrically connected to each other to transmit/receive energy, signals, data, etc. A user can fabricate a module assembly that performs a specific purpose by assembling modules according to a provided manual or an autonomously created scheme.

As one example, Patent Document 1 (Korean Patent Registration No. 1761596) discloses a module assembly fabricated by assembling various types of modules including a network module, a driving module, a sensor module, and the like. In this case, the module assembly may be utilized for various purposes such as an educational kit which allows students or users to appreciate an operational principle of an electronic device while assembling modules 10, 20, 30, and 40, a research kit used for fabricating a device for performing a specific purpose by a researcher, and a toy kit which the user is capable of assembling for a hobby.

Various persons including students, normal persons, and the like in addition to the researcher which is a software or hardware specialist use the module assemblies as mentioned above. However, except for the specialist, it may be difficult for the normal persons or students to assemble the module assemblies so that respective modules operate normally and prepare and use software suitable for driving the assembled module assemblies, and as a result, there may be a restriction on dissemination of the module.

In particular, since codings such as logic operations on signals generated by various hardware such as a sensor or a button should use various application program interfaces (APIs), the codings may be coding techniques having a high difficulty level for general persons or students. Therefore, there is a need for a system in which a compilation process is omitted so that people other than experts can utilize various hardware more easily.

SUMMARY OF THE INVENTION

The present invention is contrived to cope with the above-described technical problems and the present invention has been made in an effort to provide a system for coding without compilation, which is capable of substantially supplementing various problems caused by limitations and disadvantages in the related art, and capable of simplifying an operation and maximizing efficiency by skipping a compilation process so that a module assembly can perform a relay operation based on a function operation order, and a module assembly.

An exemplary embodiment of the present invention provides a system for coding without compilation, which includes: a module assembly connected to a user terminal and a function information providing server through a network and including a plurality of modules; and a function information providing server including a function information reception unit receiving function information from the plurality of modules constituting the module assembly, a function action order generation unit generating a total sequence for a function action order based on the function information, and a function action information transmission unit transferring a command word to the module based on the function action order, in which the command word includes at least one of unique information of a next module relayed next to the module which operates based on the function action order and function number type function information to be executed in the next module, and the command word is sequentially transferred to the module relayed based on the function action order.

According to an exemplary embodiment of the present invention, the plurality of modules may store unique function information for each module and include at least one function information for each module.

According to an exemplary embodiment of the present invention, the function action order may be an order in which the module assembly is assembled by a user.

According to an exemplary embodiment of the present invention, the function action order may be generated in a sequence manufacturing system based on the function information and may be irrespective of the order in which the module assembly is assembled.

According to an exemplary embodiment of the present invention, the function information providing server may sequentially perform wireless communication with the module relayed by the function action order and transfer the matched command word to the relayed module in a total sequence.

According to an exemplary embodiment of the present invention, the function information providing server may transfer the total sequence to the relayed module by the function action order in a lump, and the module receiving the total sequence transferred in a lump may perform an action matched with the function action of the module in the total sequence and transfer the total sequence to the next module after the function action is completed.

According to an exemplary embodiment of the present invention, a module outputting a function result among the plurality of modules relayed by the function action order may output 0 or 1 as a result and the function information providing server may further include a function result reception unit receiving the result.

According to an exemplary embodiment of the present invention, the function action information transmission unit may transfer the command word based on the result received from the function result reception unit.

According to an exemplary embodiment of the present invention, the command word may be executed at least one time based on the result received from the function result reception unit or the same action may be repeated.

According to an embodiment of the present invention, the module assembly may include at least one of an input module and an output module, the input module may be at least one of an environment module, a button module, a gyroscope module, a mic module, an infrared module, a dial module, and an ultrasound module, and the output module may be at least one of an LED module, a speaker module, a display module, a motor controller module, and a motor module.

According to an embodiment of the present invention, the module assembly may further include a dial module, a button module, and a display module.

Another exemplary embodiment of the present invention provides a module assembly including a plurality of modules, which includes: a master module including a function information reception unit receiving function information from the plurality of modules, a function action order generation unit generating a total sequence for a function action order based on the function information, and a function action information transmission unit transferring a command word to the module based on the function action order; and an action module relayed based on the function action order received from the master module.

The solving means of the problem according to the present invention is not limited by the contents exemplified above, and other various effects are included in the present specification.

The following effects are at least achieved by the exemplary embodiments of the present invention.

According to the present invention, it is possible to simplify an operation and maximize efficiency by skipping a compilation process so that a module assembly can perform a relay operation based on a function operation order.

According to the present invention, a sequence for the function operation order is stored in a master module, a total sequence itself is transferred between modules, and a function operation matched with the module in function information is performed to skip an unnecessary data transmission/reception process, thereby increasing an operation speed.

According to the present invention, the operation of the module assembly is specified by inputting a variable when function operation information is transferred between the modules, thereby increasing utilization of a product.

The effects according to the present invention are not limited by the contents exemplified above, and more various effects are included in the present specification.

DETAILED DESCRIPTION

Advantages of the present invention, and methods for accomplishing the same will be more clearly understood from embodiments described in detail below with reference to the accompanying drawings. However, the present invention is not limited to the following embodiments but may be implemented in various different forms. The embodiments are provided only to make description of the present invention complete and to fully provide the scope of the present invention to a person having ordinary skill in the art to which the present invention pertains, and the present invention will be just defined by the appended claims.

The shapes, sizes, ratios, angles, numbers, and the like illustrated in the drawings for describing the embodiments of the present invention are merely examples, and the present invention is not limited thereto. Further, in describing the present invention, a detailed explanation of known related technologies may be omitted to avoid unnecessarily obscuring the subject matter of the present invention. The terms such as "including," "having," and "consisting of" used herein are intended to allow other components to be added unless the terms are used with the term "only". A case of expressing a component as a singular form includes a case in which the component includes a plural form unless expressly stated otherwise.

Components are interpreted to include an error range even if not expressly stated.

The features of various embodiments of the present disclosure can be partially or entirely bonded to or combined with each other and can be interlocked and operated in technically various ways so as to be sufficiently appreciated by those skilled in the art, and the embodiments can be carried out independently of or together in association with each other.

Hereinafter, a module assembly according to an exemplary embodiment of the present invention will be described in detail with reference to FIGS. 1 and 2.

Figure 1:
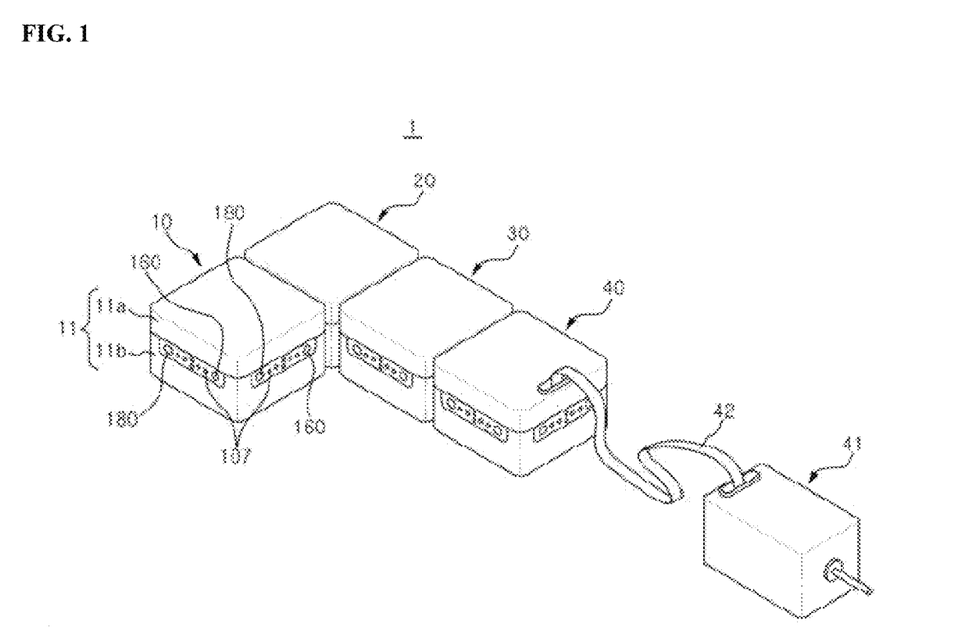
FIG. 1 is a perspective view illustrating a state where a module assembly is assembled according to an exemplary embodiment of the present invention.

FIG. 1 is a perspective view illustrating a state where a module assembly is assembled according to an exemplary embodiment of the present invention. FIG. 2 is a plan view illustrating an internal structure of a module according to an exemplary embodiment of the present invention.

Referring to FIG. 1, a module assembly 1 is constituted by a plurality of modules 10, 20, 30, and 40 which may be assembled with each other.

In the exemplary embodiment, the module assembly 1 may be defined as a set of one or more modules 10, 20, 30, and 40 which may be assembled to each other or a structure in which the modules 10, 20, 30, and 40 are assembled and is not limited by a purpose, a type, a form, the number of modules, etc. For example, the module assembly 1 may be a part of an educational kit which allows a student or a user to appreciate an operational principle of an electronic device while assembling the modules. Alternatively, the module assembly 1 may be a part of a research kit which a researcher uses for fabricating a device for performing a specific purpose. Alternatively, the module assembly 1 may be a part of a toy kit which the user may assemble for a hobby.

For easiness of description, in the embodiment, an example in which the module assembly 1 is constituted by four modules 10, 20, 30, and 40 as illustrated in FIG. 1 is described and the four modules will be referred to as a first module 10, a second module 20, a third module 30, and a fourth module 40, respectively.

A plurality of modules 10, 20, 30, and 40 may be defined as objects configured to transmit and receive a signal, data, or electrical energy (hereinafter, also referred to as an 'electrical signal') represented as a change in voltage or current to and from another module or an external device. The modules 10, 20, 30, and 40 include a central processing unit (CPU), a memory, a power supply, etc., or a sensing means, a processing means, a driving means, etc., which is operable by being controlled by another module to be independently driven, respectively.

The respective modules 10, 20, 30, and 40 may be configured to independently perform specific functions or perform specific functions by interaction with another module. When the modules include a central processing unit (CPU), firmware may be installed for each module.

For example, the respective modules 10, 20, 30, and 40 may be broadly classified into an input module, an output module, and a setup module.

Here, the input module may be constituted by an infrared (IF) module capable of receiving an infrared signal from a remote controller, etc., a gyroscope sensor module capable of sensing X, Y, and Z-axis change angles and acceleration, a dial module capable of measuring a rotational angle or a rotational speed using rotation of a module handle, a button module capable of sensing pressing of a button, sensing click, double-click, and pressed states, and maintaining an on/off state using toggle, an environment module capable of measuring a temperature, humidity, illuminance, etc., a mic module capable of sensing ambient sound intensity (dB) and a frequency, and an ultrasonic module capable of sensing a distance.

The output module may be constituted by an LED module capable of visual displaying depending on a color change, a speaker module, a display module displaying a picture drawn by the user, a text, or module information on a screen, a motor controller module setting a speed, an angle, and a torque and sending the electrical signal to a motor module, and rotating the motor module, or a motor module (motor; MDP-14) capable of converting the electrical signal received from the motor controller into a rotational motion.

The setup module may be constituted by a battery module used when supplying power to another module and a network module capable of connecting the module to a PC, a smart phone, or the module through Bluetooth, WiFi, or USB connection.

The respective modules 10, 20, 30, and 40 may be connected to an external driving device 41 by a cable 42. In this case, the module assembly 1 may be a device that selectively actuates the motor by receiving the signal of the remote controller or the smart phone. A configuration of the module assembly 1 is just one example and the respective modules 10, 20, 30, and 40 may be provided to perform an arbitrary function independently or through interlocking with another module.

The modules 10, 20, 30, and 40 may be a cube having a polygonal pillar shape having a plurality of lateral surfaces so as to be in face contact with another neighboring module. Here, it should be appreciated that face contact does not mean only that all areas of lateral surfaces contact each other and should be appreciated as a meaning including a case where only some of the lateral surfaces contact and the lateral surface of any one module and the lateral surface of another module partially contact each other while facing each other.

In the embodiment, it is illustrated as an example that the modules 10, 20, 30, and 40 have a plane having a square shape. In other words, it is described as an example that the modules in the embodiment have a rectangular parallelepiped having four side surfaces. Meanwhile, as another embodiment, the modules 10, 20, 30, and 40 may be formed in polygonal pillar shapes including a planar right triangular shape, a rectangular shape, a right pentagonal shape, and the like and in particular, formed in a right polygonal shape. Some modules may have different three-dimensional shapes. Further, some of the modules may have various stereoscopic shapes including a cone, a polyhedron, and the like.

Hereinafter, a configuration of the module will be described based on the first module 10 among the plurality of modules.

Here, the first module 10 may include a housing 11 forming an exterior, a terminal 107 which is exposed to the lateral surface of the housing 11 to transfer or receive the electrical signal to another connected module, a pin installation portion 150 where a pin 180 which selectively protrudes to the outside of housing is provided, and a pin receiving portion 160 into which a pin of another module is inserted.

Meanwhile, one side surface of the first module 10 may include a serial port capable of communicating with an external device. For example, the serial port may use ports of various standards capable of performing wired serial communication such as Universal Serial Bus (USB), USB-C type, IEEE 1394, Thunderbolt, etc.

A housing 11 as a case formed in a rectangular parallelepiped shape in which a flat surface is square protects internal components. As illustrated in FIG. 1, the housing 11 may be provided in a form in which an upper case 11a and a lower case 11b are coupled to each other. In a method for configuring the housing 11, the upper case 11a and the lower case 11b may be integrally formed or divided into more parts and assembled as necessary.

A terminal 107 may transfer the electrical signal to another connected module or receive the electrical signal from another module and as one example, may receive the electrical signal from a substrate 102 provided in the housing 11 and transfer the electrical signal to the terminal of another module which contacts the terminal. The terminal 107 may have multiple contact points or connection pins and may have various shapes according to a transferring method of the electrical signal, a standardized specification, and the like.

Such a terminal 107 may be disposed on one lateral surface of the housing 11 by forming one set with the pin 180, the pin installation portion 150, and the pin receiving portion 160. Specifically, the terminal 107 may be disposed between the pin 180 and the pin receiving portion 160 and may contact the terminal disposed between the pin and the pin receiving portion of another module.

In the exemplary embodiment, it is described as an example that the terminal 107 is provided on all lateral surfaces of the housing 11, but there may be a lateral surface without the terminal 107 in some exemplary embodiments.

Figure 2:
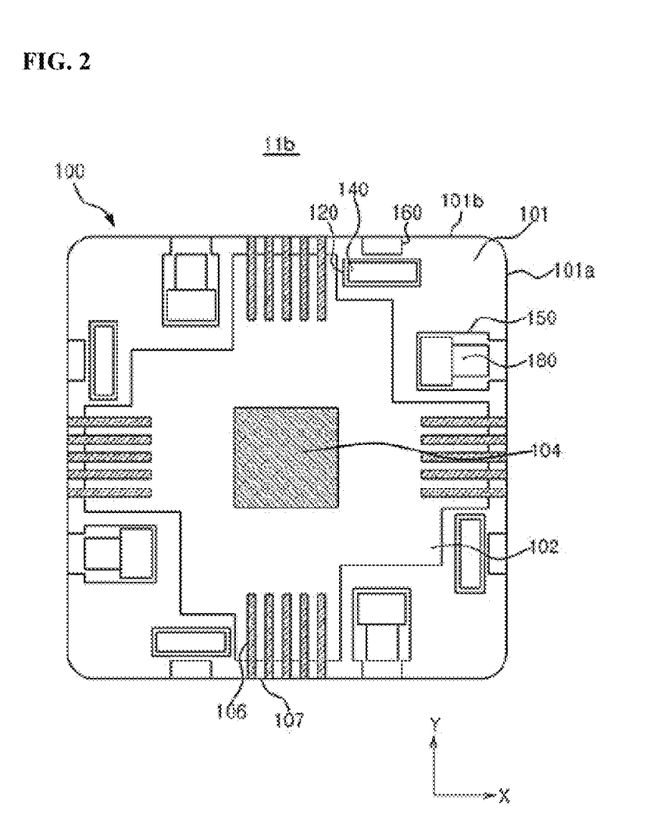
FIG. 2 is a plan view illustrating an internal structure of a module according to an exemplary embodiment of the present invention.

Referring to FIG. 2, the lower case 11b may include a frame 100 forming the external and internal structure, a substrate 102 provided inside the frame 100, and a functional unit 104 installed on the substrate 102.

The frame 100 as a structure that configures a part or the entirety of the housing 11 may provide a space and a structure for forming the exterior of a part or the entirety of the housing 11 and installing various components therein. In the exemplary embodiment, it is described as an example that the frame 100 forms the lower case 11b of the housing 11, but the scope of the present invention is not limited thereto. Further, in the exemplary embodiment, the frame 100 is formed in a rectangular shape and has four corners 101.

The functional unit 104 for implementing the function of the first module 10 may be mounted on the substrate 102 and may be fixedly installed in an inner space center of the frame 100. The functional unit 104 may include, for example, a microprocessor and in this case, when the first module 10 is driven by independent firmware, the functional unit 104 may be provided in order to control the first module 10.

As yet another example, when the first module 10 is an infrared sensor module, the functional unit 104 may include required devices such as an infrared sensor and an analog digital converter (ADC) required for processing a value sensed by the infrared sensor and an interface required for communication with another module or external hardware, e.g., a communication interface such as I2C, UART, or USB. As such, the types of modules 10 to 40 of the present invention may be determined according to the function of the functional unit 104.

As yet another example, the functional unit 104 may includes the microprocessor and the memory and becomes a control module when the functional unit 104 includes an OS or firmware capable of controlling other units.

Alternatively, the functional unit 104 becomes the sensor module when being capable of transferring the sensed value of the sensor to another module or the external device.

Alternatively, the functional unit 104 may become a communication module when being capable of transmitting the electrical signal to another external device through the wired/wireless communication device by receiving the electrical signal from another module while including various wired/wireless communication devices including NB-IOT, LTE, LoRa, WiFi, Bluetooth, USB, a cable modem, etc.

Alternatively, the functional unit 104 may become a driving module when being actuatable while including various actuators including the motor and the like and actuator control circuits. Other more detailed structures and combinations of the modules of the present invention are disclosed in detail in Korean Patent No. 10-1761596 and included in the specification of the present invention by reference.

Hereinafter, a system for coding without compilation, which assembles the module assembly 1 having the structure and provides the function action information to the module based on the function information of the module assembly 1 will be described with reference to FIG. 3.

Figure 3:
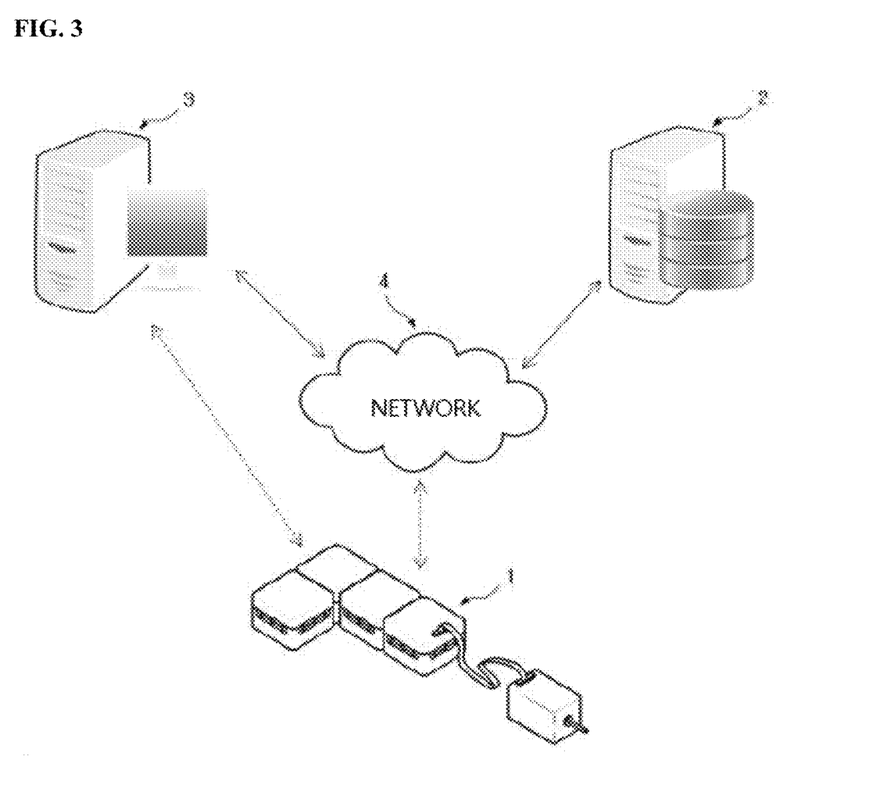
FIG. 3 is a schematic view of a system for coding without compilation according to an exemplary embodiment of the present invention.

FIG. 3 is a schematic diagram of a system for coding without compilation according to an exemplary embodiment of the present invention.

Referring to FIG. 3, the system for coding without compilation may include a module assembly 1, a function information providing server 2, and a user terminal 3. In this case, the module assembly 1 may be connected to the function information providing server 2 and the user terminal 3 through a network 4. In the exemplary embodiment, an example is described in which the network 4 is implemented by the Internet. However, the present invention is not limited thereto and those skilled in the art may implement connections of the module assembly 1 with the function information providing server 2 and the user terminal 3 through various networks.

The network 4 includes a wired short-range communication means such as USB, RS-232, and IEEE1394, a wireless short-range communication means such as WiFi and Bluetooth, and Internet connection.

The module assembly 1 is constituted by at least one module or two or more modules and operations performed by respective modules are stored in a database in the module in the form of a function number. In other words, at least one function information is numbered and included in the module in the form of the function number. Detailed description related thereto will be described later.

The function information providing server 2 or the user terminal 3 may receive function information from respective modules constituting the module assembly 1 through the network 4 and store the function information as the database. In this case, the function information providing server 2 or the user terminal 3 provides function action information to the modules constituting the module assembly 1 based on the function information. Detailed description related to the function information and the function action information will be described later in detail with reference to FIG. 5, etc.

The function information providing server 2 or the user terminal 3 may store the function information of the modules constituting the module assembly 1 as the database in advance. Therefore, the function operation information may be provided to each module based on the function information and the database of the module assembly of a current user.

The function information providing server 2 or the user terminal 3 may determine whether there is the error in assembling the module assembly 1 by checking an integrity of an execution rule of a total sequence for the operation order and provide the assembly error information to the module assembly 1. In other words, the function information providing server 2 or the user terminal 3 checks whether the module assembly 1 operates according to the execution rule by the integrity of the execution rule.

Here, assembly error information may include at least one module unique information (module ID) with the error.

The module assembly 1 outputs that there is the assembly error in a module with at least one error based on the assembly error information provided from the function information providing server 2 or the user terminal 3. It is apparent to those skilled in the art that the module assembly 1 may output that there is the assembly error by flickering an LED of the module with at least one error to a predetermined color, but output that there is the assembly error by another scheme.

According to another exemplary embodiment of the present invention, the function information providing server 2 or the user terminal 3 may store unique function information of the module constituting the module assembly 1 and a total sequence for an action order (or also referred to as an "execution order") of the modules constituting the module assembly 1 as the database. In this case, the total sequence may be set through a sequence production system by the user or automatically generated to be matched with an assembly order of the user. A detailed action related thereto will be described later with reference to FIGS. 6A and 6B. Meanwhile, the total sequence is stored in a separate module other than the function information providing server 2 to help perform a function action. In other words, the total sequence may be stored in the database of the server or a separate module (or also referred to as a "master module) to transfer matched function information to each assembled module. Alternatively, a function number matched with the module may operate in the module while the total sequence is entirely transferred between the assembled modules. Here, detailed description related to the master module will be described later with reference to FIG. 7.

According to yet another exemplary embodiment of the present invention, the function information providing server 2 or the user terminal 3 may provide the source code based on the assembly information of the currently assembled module assembly 1 and the database. As a result, the function information providing server 2 or the user terminal 3 may recommend information on a module at a location to be removed, replaced, and added in the module assembly 1 and the location based on the source code. In this case, the module information at the location to be added or replaced means information on a module that may perform an additional operation as compared with a current configuration by additionally attaching the module or may be replaced in the current configuration of the module assembly 1.

Hereinafter, a function action of the module assembly according to an exemplary embodiment of the present invention will be described in detail with reference to FIG. 4.

Figure 4:
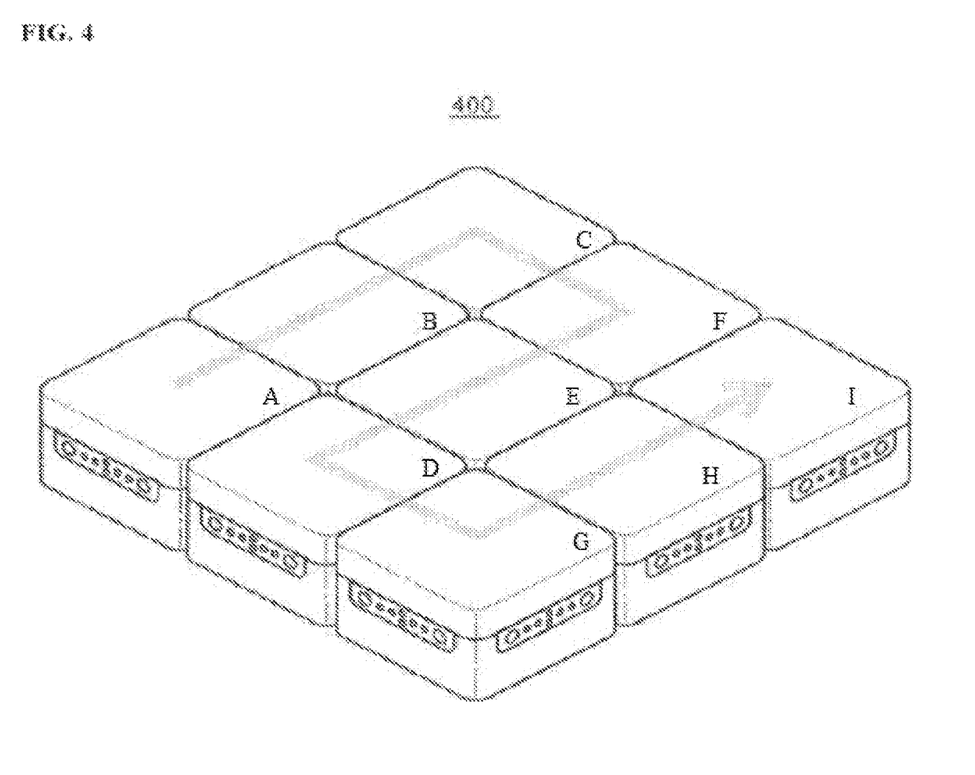
FIG. 4 is a schematic view for describing a module assembly according to an exemplary embodiment of the present invention.

FIG. 4 is a schematic view for describing a module assembly according to an exemplary embodiment of the present invention. FIG. 4 illustrates only some of the modules in the exemplary embodiments for convenience of description and duplicated description of each module will be omitted.

Referring to FIG. 4, the module assembly 400 is constituted by a plurality of modules and respective modules are sequentially assembled. As illustrated in FIG. 4, the module assembly 400 constituted by nine modules (modules A to I) is described by assuming that the module assembly 400 is assembled in the shape of a letter 'ㄹ'. As a result, the modules operate in the order in which the modules are assembled by the user and in this case, each module may operate based on function information stored in the function providing server 2 as the database. Here, the function information relates to function performed for each module and is stored in a module-specific database (or a server database) in the form of a function number. It is characterized in that the function information according to an exemplary embodiment of the present invention is set one by one for each module.

In other words, the function information is stored in the database as large as the number of modules to be assembled and the function information providing server 2 transmits matched function action information in the order in which the modules are assembled based on the function information. Meanwhile, it is assumed that the module assembly 400 is assembled in the shape of the letter 'ㄹ', but a connection direction is not limited thereto and the module assembly 400 may be assembled layer by layer in either the horizontal or vertical direction. However, when functions of respective modules are performed, the modules should be arranged by determining as the connection direction a location that does not affect performing the functions as possible. For example, when there are a communication module and a gyroscope sensor module, electromagnetic waves of the communication module may affect sensing of the gyroscope sensor module, and as a result, it is necessary to determine the position by considering such a situation.

As such, the module assembly 400 according to an exemplary embodiment of the present invention is characterized in that an assembly order of the modules itself is determined as the operation order of the module assembly 400. Accordingly, the function information providing server 2 stores only the function information in the database to minimize a burden of the server.

Hereinafter, the function action of the module assembly according to another exemplary embodiment of the present invention will be described in detail with reference to FIG. 5.

Figure 5:
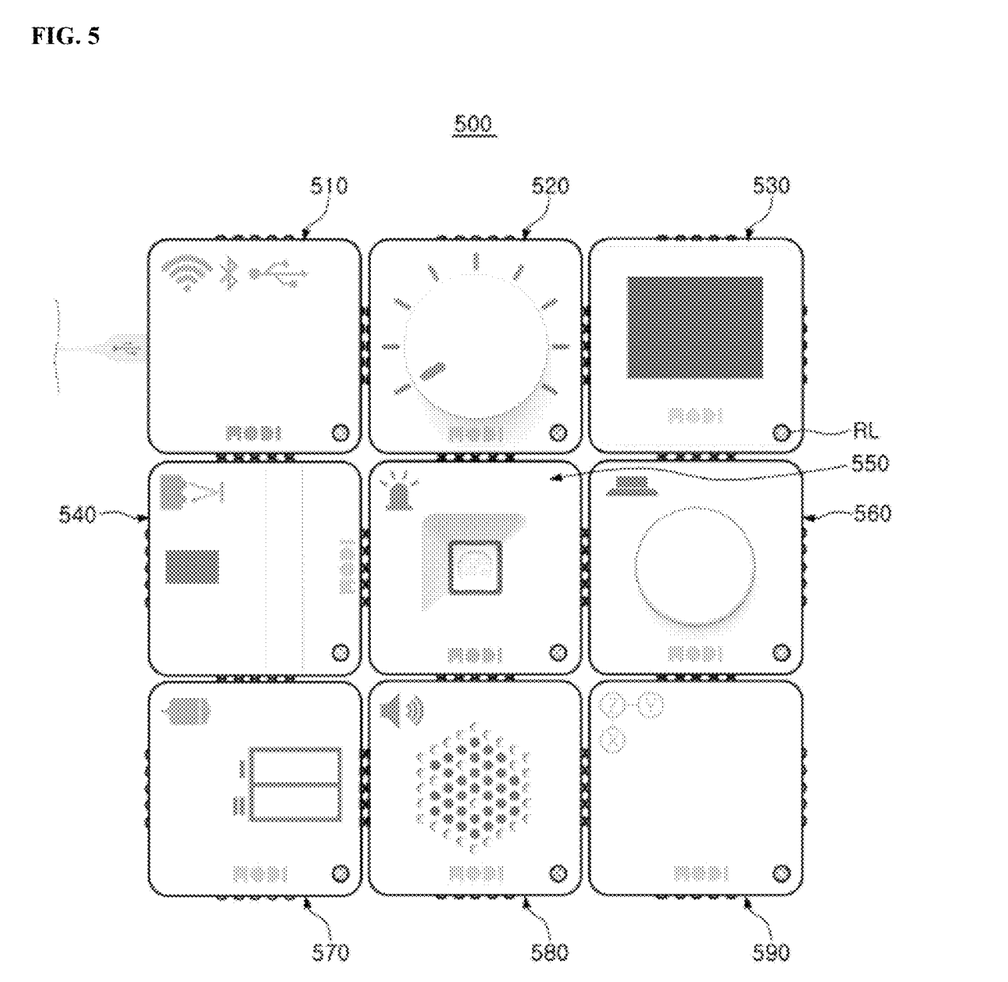
FIG. 5 is an exemplary diagram for describing a module assembly according to another exemplary embodiment of the present invention.

FIG. 5 is an exemplary diagram for describing a module assembly according to another exemplary embodiment of the present invention. Since the module assembly illustrated in FIG. 5 is different from the module assembly illustrated in FIG. 4 only in a process in which the function action is performed and is the same as the module assembly illustrated in FIG. 4 in a configuration, duplicated description will be omitted.

Referring to FIG. 5, the module assembly 500 includes a network module 510, a dial module 520, a display module 530, an infrared module 540, an LED module 550, a button module 560, a motor controller module 570, a speaker module 580, and a gyro sensor module 590. The module assembly 500 may be implemented to further include one separate module based on a fact that the total sequence for the action is stored in the function information providing server 2 so as to control the action of the module assembly 500. In other words, although not illustrated in FIG. 5, the module assembly 500 may further include a master module storing a total sequence for controlling actions of the constituted modules. In this case, the master module is basically implemented in the same form as the modules constituting the module assembly 500, but is not limited thereto.

The module assembly 500 according to another exemplary embodiment of the present invention is assembled regardless of the action order of the module. As a result, the respective modules constituting the module assembly 500 may perform the action in a function action order predetermined by the user even though the respective modules are assembled at positions different from the positions of the modules illustrated in FIG. 5.

The modules 510 to 590 constituting the module assembly 500 transmit the function information to the function information providing server 2 through the network and the function information providing server 2 receiving the function information sequentially transmits the function action information to the modules 510 to 590. Here, the function information is information acquired by numbering and classifying unique actions performed by the respective modules and at least one function may be included in one module. In other words, it is characterized in that the function information according to another exemplary embodiment of the present invention may be set at least one by one per module, and as a result, the function action order is stored in the database of the function information providing server 2 together with a plurality of function information.

When an example of the function information for each module is described with reference to the modules illustrated in FIG. 5, the dial module 520 may include a plurality of function information such as rotating by one space on a scale (function 2), rotating by two spaces on the scale (function 3), rotating by three spaces on the scale (function 4), etc. Alternatively, the infrared module 540 may include function information such as sensing whether there are infrared rays which are reflected and returned within 0 to 10 cm (function 1), sensing whether there are infrared rays which are reflected and returned within 11 to 20 cm (function 2), sensing whether there are infrared rays which are reflected and returned within 21 to 30 cm (function 3), etc. Alternatively, the LED module 550 may include information about a plurality of functions such as blinking once (function 1), blinking once per second (function 2), maintaining and outputting one color (function 3), etc. Alternatively, the motor module may include a plurality of function information including going straight (function 1), going backward (function 2), turning right (function 3), turning left (function 4), turning once in place (function 5), and stopping (function 6).

As a result, the function number matched with the module is transferred to the modules as an action command so that each of the modules performs the function action based on the function information. In other words, it is preferably appreciated that the function action information is transferred to the modules based on the function information stored in the database.

Meanwhile, the number of function information included in each module and the function of the function information are not limited thereto and may be set by the user in advance. Further, it is assumed that the function number is set to a different number in each module as described above and the function numbers of the modules may overlap with each other, but is not limited thereto. For example, the function number may be assigned to correspond to the number of modules so that the function number does not overlap for each module. In other words, module A may include function 1, function 2, and function 3 and module B may include function 4, function 5, and function 6.

As a result, the respective modules constituting the module assembly 500 may operate based on the function action order stored in the database and the function information providing server 2 may generate the function command in the module which operates based on the order. For example, the function information providing server 2 may transmit a command such as "Perform function 1" to module A and module A receiving the command may perform function 1 and then transmit a command such as "Perform function 2" to module B which is a next action sequence of module A. In this case, it is characterized in that the modules performing the function action according to the generated function command sequentially operate and the number of action times of the module is not limited thereto. In other words, if the actions of the modules do not overlap, it is preferably appreciated that one module may operate several times. Detailed description related thereto will be described below in detail with reference to FIG. 5.

A relay display lamp RL may be disposed at one edge of each module constituting the module assembly 500. The relay display lamp RL is an LED display lamp for checking up to which modules the function action is performed in the module assembly 500 and it is preferably appreciated that the relay display lamp RL is a different component from the LED module according to an exemplary embodiment of the present invention. The relay display lamp RL outputs a predetermined color preset as an LED based on the function action order preset by the user. As a result, the relay display lamp RL is turned on while the module performs the function action and when the function action is finished, the relay display lamp RL is turned off.

As a result, if the LED is not displayed in the relay display lamps RL of the modules 510 to 590 constituting the module assembly 500 for a predetermined time or more, it may be determined that an error occurs. Alternatively, when the error or interrupt from the outside occurs in the specific module while the modules 510 to 590 operate according to the function action order, the relay display lamp RL of the specific module may indicate that the error occurs. For example, when the error occurs in the specific module, a color different from a relay checking display color (a color expressed during a normal action) is output through the LED to allow the user to check that the error occurs. Here, the case where the error occurs may be defined as a situation in which the unique function action of the module is not performed in any module or a situation in which the function actions simultaneously occur in a plurality of modules. Further, the interrupt from the outside may be defined as a situation in which the function action is intentionally stopped by the user or a situation in which the function action is stopped by an external obstacle.

Accordingly, in the module assembly 500 according to another exemplary embodiment of the present invention, the modules are assembled regardless of the action order, and as a result, anyone may easily manufacture and utilize the module assembly.

Hereinafter, a smart car will be described in detail, which moves according to the function action order when the obstacle is sensed based on the function action according to the exemplary embodiment of the present invention with reference to FIGS. 6A and 6B.

Figure 6A:
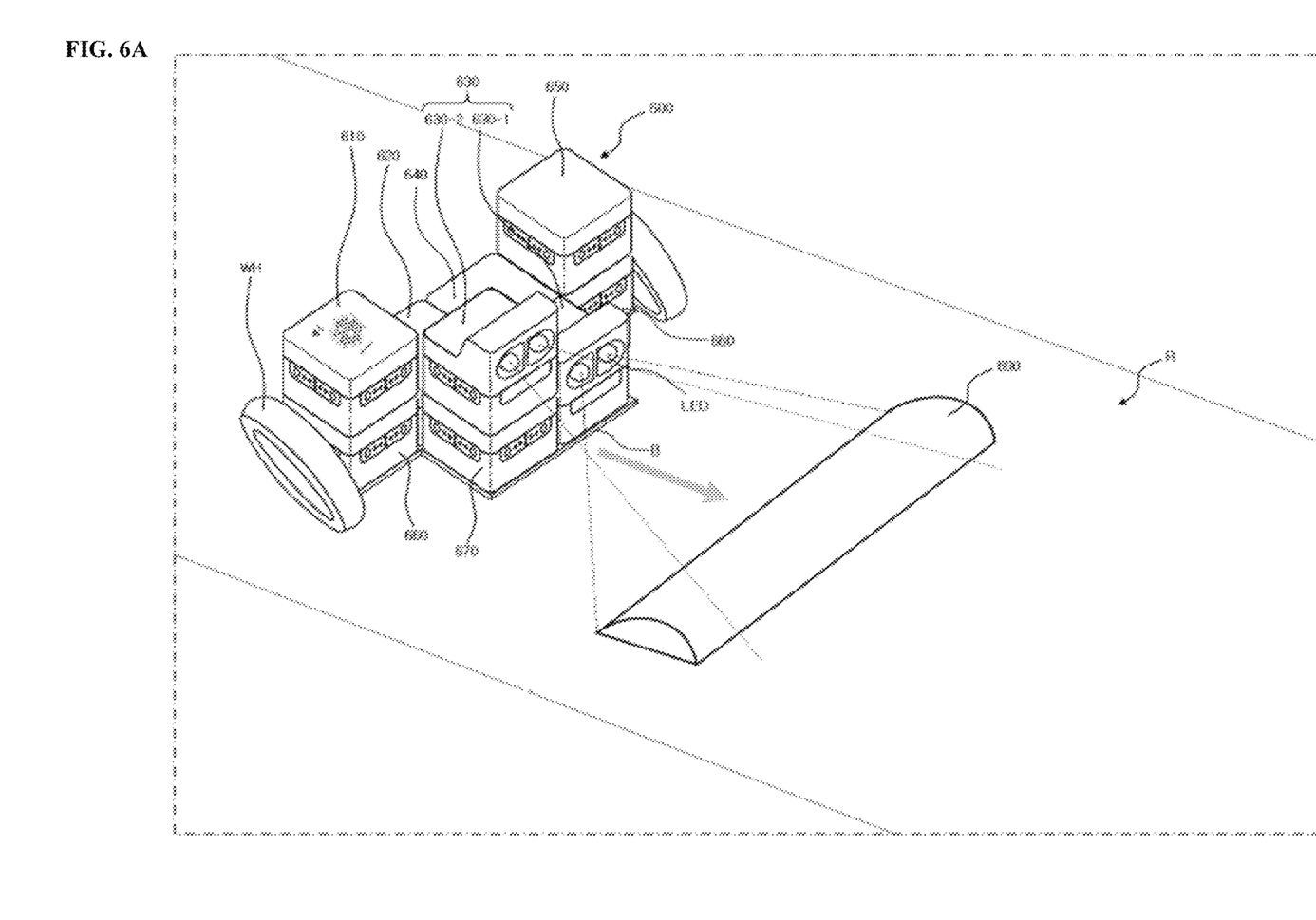
FIG. 6A is an exemplary diagram illustrating a function operation of a smart car using a module assembly according to an exemplary embodiment of the present invention.
Figure 6B:
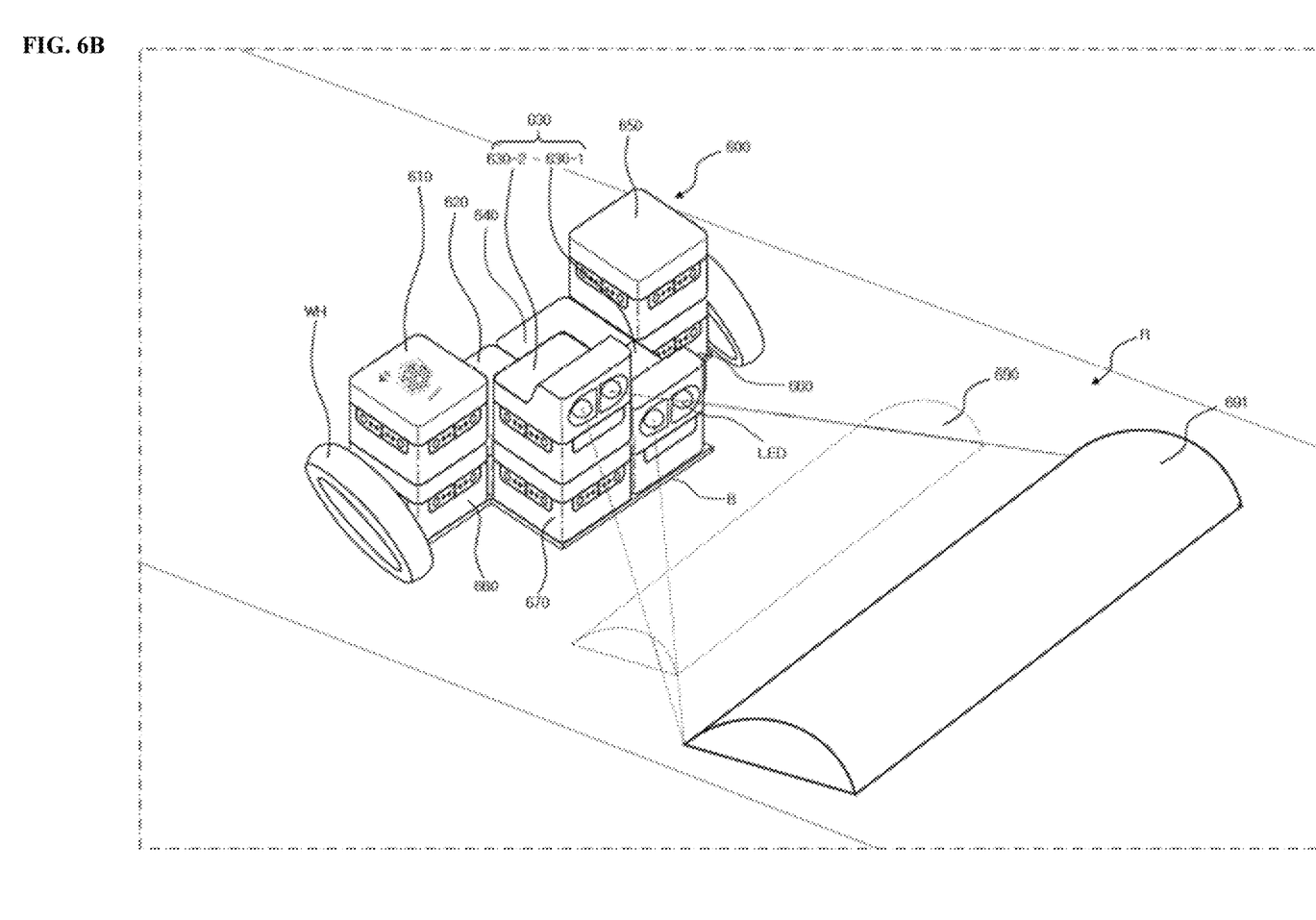
FIG. 6B is an exemplary diagram illustrating a function operation of a smart car using a module assembly according to an exemplary embodiment of the present invention.

FIGS. 6A and 6B are exemplary diagrams illustrating a function action of a smart car using a module assembly according to an exemplary embodiment of the present invention. It is assumed that the modules constituting the smart car illustrated in FIGS. 6A and 6B are assembled regardless of the function action order. Since the smart car illustrated in FIGS. 6A and 6B is assembled by using some of the modules, duplicated description of the module function will be omitted. Further, a plurality of modules constituting the smart car 600 is selectively assembled by the user and as long as there is no problem in action, the module may be substituted, removed, and added. Further, positions of the modules constituting the smart car 600 may also be changed.

Referring to FIG. 6A, the smart car 600 includes a base substrate B disposed on the bottom so that the modules are to be assembled, and a speaker module 610, a display module 620, an infrared module 630, a network module 640, a gyro sensor module 650, a motor module 660, and a battery module 670 disposed on the base substrate B. In this case, it is illustrated that the plurality of modules are assembled to be stacked in one layer or two layers, but the plurality of modules may be three or more layers. Further, any one of the plurality of modules may serve as the master module or may be replaced with the master module.

Referring to FIG. 6A, wheels WH are connected to the motor modules 660 disposed at both sides of the base substrate B and positioned on a lower layer. In this case, in two motor modules 660, the speaker module 610 is assembled to one side and the gyro sensor module 650 is assembled to the other side.

Two infrared modules 630 are disposed at the center of the base substrate B. In this case, two infrared modules 630 disposed at the center are constituted by a first infrared module 630-1 and a second infrared module 630-2 disposed at different heights.

The first infrared module 630-1 is assembled to be attached (positioned on the lower layer of) to the base substrate B and used for measuring a proximity for a short distance. The second infrared module 630-2 is assembled to an upper portion of the battery module 670 attached to the base substrate B and used for measuring the proximity for a longer distance than the distance measured by the first infrared module 630-1 by a predetermined length. Hereinafter, for example, the function action will be described by assuming that the first infrared module 630-1 measures a distance of 0 to 10 cm and the second infrared module 630-2 measures a distance of 11 to 20 cm.

The smart car 600 may receive the function number matched for each module in the total sequence stored in the function information providing server 2 and perform an action corresponding to the function number (case 1) and randomly transfer the total sequence between the modules and perform the action corresponding to the function number (case 2).

First, when the smart car 600 is operated according to case 1, the function information included in the plurality of modules 610 to 670 which is arbitrarily assembled by the user is transmitted to the function information providing server 2. The function information providing server 2 receiving the function information generates the total sequence for setting the function action order so as to relay the function information by using a sequence manufacturing system and stores the generated total sequence in the database or transfers the stored total sequence to the master module and stores the transferred total sequence in the master module. Therefore, the function information providing server 2 or the master module designates a next module according to a relay order based on the stored function action order and repeats a process of transmitting the function number to the corresponding module to operate the smart car 600.

When the smart car 600 is operated according to case 2, the total sequence is generated by the aforementioned method by using the function information included in the plurality of modules 610 to 670 which is arbitrarily assembled by the user. In this case, the generated total sequence is randomly transmitted and received among the modules according to the function action order of the modules and when the module randomly receiving the total sequence has the function number matched with the function action order included in the total sequence, the module repeats a process of performing the function action corresponding to the matched function number and then transferring the total sequence to the next module to operate the smart car 600.

The smart car 600 set to operate as described above may perform an operation such as sensing the obstacle by using two infrared modules 630, outputting a beep through the speaker module 610 according to an obstacle sensing distance, and straight driving, stopping, or backward driving the smart car 600 by operating the motor module 660 according to whether to sense the obstacle in two infrared modules 630.

Prior to detailed description, in this specification, it is described that the command is transferred to the module for convenience of description, but transferring the command is preferably appreciated as transferring the unique function number of the module to the corresponding module for a relay action of the module assembly.

Referring to FIG. 6A, the function information providing server 2 transfers the command to the first infrared module 630-1 of the smart car 600 through a specific function number (e.g., function 1). Thereafter, the first infrared module 630-1 receiving the command checks whether there are infrared rays which are reflected and returned in the range of 0 to 10 cm. When there are the infrared rays which are reflected and returned from the first infrared module 630-1, it is determined that there is the obstacle (i.e., Output is YES (=1) and when there is no infrared ray which is returned, it is determined that there is no obstacle (i.e., Output is No (=0). In this case, as illustrated in FIG. 6A, when it is determined there is an obstacle 690, the function information providing server 2 transfers the command to the second infrared module 630-2 to allow the second infrared module 630-2 to determine whether there is the obstacle or transfers the command to the motor module 660 to stop a wheel. Besides, various function commands such as making the beep, etc., may be transferred to the next module through the speaker module 610.

As such, the first infrared module 630-1 may transmit a determination result to the function information providing server 2 and the function information providing server 2 may transfer the command to the next module according to the determination result. As illustrated in FIG. 6A, when it is determined that there is no obstacle (Out=0) as a result of determining whether there is the obstacle by the second infrared module 630-2 which is the next module based on the stored function action information, the function information providing server 2 transfers the command to the motor module 660 to drive the smart car 600 straight in an arrow direction. In this case, even though there is the obstacle 690, when the second infrared module 630-2 located at a high position may not sense the obstacle 690 because the obstacle 690 is formed low, it may be determined that the smart car 600 is enough to cross the obstacle 690. However, when it is determined that there is no obstacle, various commands such as transferring a command of straight driving to the motor module 660, and the like may be executed as described above.

Thereafter, a process of designating the next module and transmitting the function number to the next module is repeated to duplicatively perform the function actions of the motor module 660 and the infrared module 630. When the smart car 600 faces an obstacle having a large size as illustrated in FIG. 6B, the first infrared module 630-1 and the second infrared module 630-2 determines whether there is the obstacle while sequentially operating and when it is sensed that there is the obstacle in both the infrared modules 630, the function information providing server 2 transfers a function number related to stopping to the motor module 660 as a command (word).

The smart car 600 may further include an LED module. For example, the LED module may distinguish movement of a vehicle with a color by outputting a green LED while the vehicle moves and outputting a red LED while stopping. Alternatively, in an emergency situation, a red LED may blink as a meaning of a warning and this may be executed by transferring variable information simultaneously when the function information providing server 2 transfers the function action information to the LED module. In other words, for example, when the function information providing server 2 transfers a variable '3' while transferring function 3 (outputting the red LED) to the LED module as the command word, the LED module may output the red LED and perform a three-time blinking operation.

As such, the function information providing server 2 according to yet another exemplary embodiment of the present invention transfers the variable simultaneously when transferring the function action information to the module to further materialize the action of the module assembly, thereby increasing utilization of a product. In this case, the variable may be input by a variable module which has a form of the module and performs an independent function or input in a scheme in which the variable is recognized by the module in the form of a card reader or a chip.

Hereinafter, detailed components of the master module will be described in detail with reference to FIG. 7.

Figure 7:
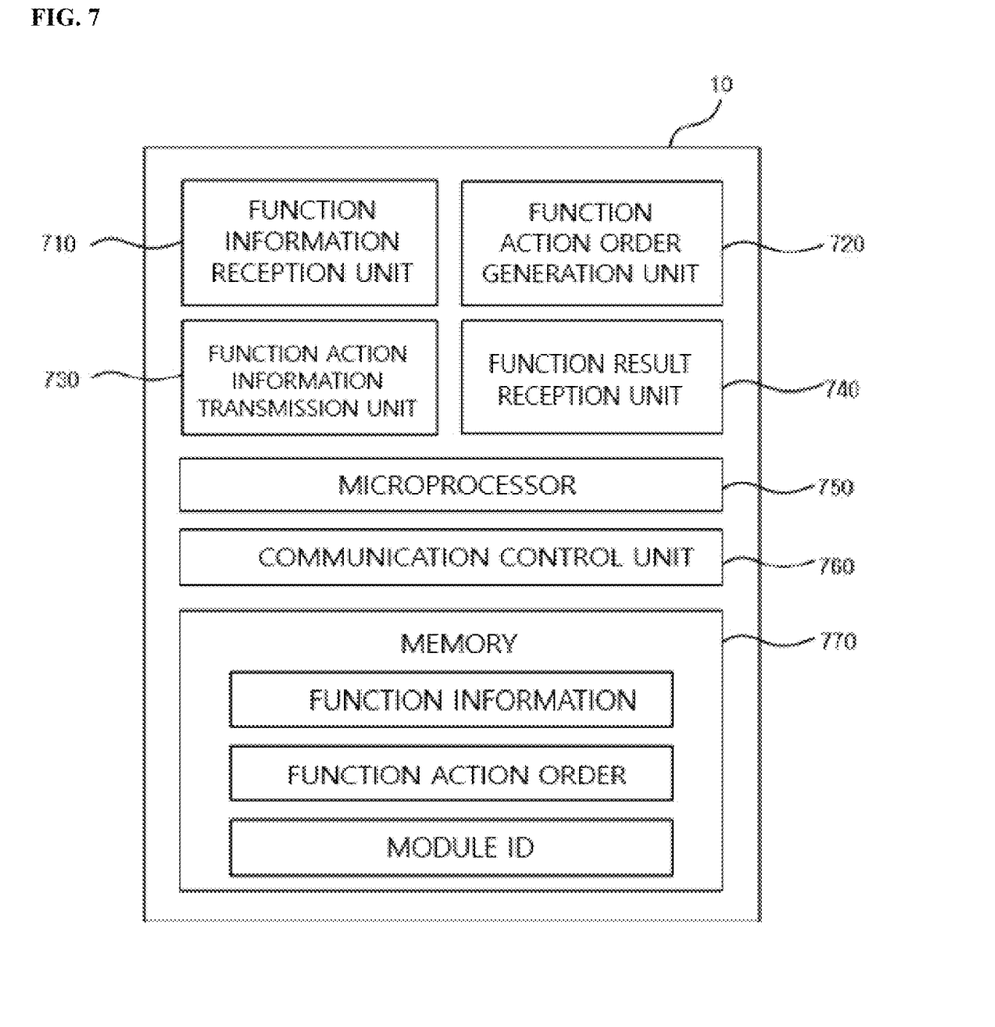
FIG. 7 is a block diagram for describing components of a master module according to an exemplary embodiment of the present invention.

FIG. 7 is a block diagram for describing components of a master module according to an exemplary embodiment of the present invention.

Referring to FIG. 7, the master module 700 may be a network module that includes a function information receiving unit 710, a function action order generation unit 720, a function action information transmission unit 730, a function result reception unit 740, a microprocessor 750, a communication control unit 760, and a memory 770, but it is apparent to those skilled in the art that the master module 700 may serve as another module category.

The function information receiving unit 710 is a software component receiving function information for a plurality of modules when the master module 700 is connected to other modules or servers. The function information includes module's unique information.

The function action order generation unit 720 is a component that generates a function action order based on the received function information. In this case, the function action order may be generated by setting the function action order by using a sequence manufacturing system by a user or automatically generated while the user assembles the module. The function action order generation unit 720 may sequentially give a command to modules which perform a relay action to correspond to the generated function action order.

The function action information transmission unit 730 is a component that sequentially transfers a function number type command to modules matched with the function action order based on the received function information. After a specific module performs an action corresponding to the function number transferred from the function action information transmission unit 730, the specific module distinguishes whether there is the action or there is no action as 'yes/no' and transmits the distinguishing result to the function result reception unit 740.

The function result reception unit 740 is a component that distinguishes and indicates yes and no as 1 and 0 so as to check whether to perform the action by the specific module and receive yes or not to determine the action.

When at least some of the function information receiving unit 710, the function action order generation unit 720, the function action information transmission unit 730, the function result reception unit 740, and the communication control unit 760 are implemented as a software module, the microprocessor 750 executes the software module.

The communication control unit 760 may control communication with an external device and communication between the modules. The communication with the external device may include various wired/wireless communication including NB-IOT, LTE, LoRa, WiFi, Bluetooth, USB, a cable modem, etc. Meanwhile, the communication between the modules may perform inter-module communication by using various internal communication means including UART, I2C, LIN, CAN, etc. The communication control unit 760 may include various wired/wireless communication means or the communication means between the modules and perform communication by a scheme of controlling a separate network module when being connected to the separate network module.

Meanwhile, the memory 770 may store the software module which may be executed by the microprocessor 750, the function information, the function action order, and a module ID.

According to the present invention, it is possible to simplify an operation and maximize efficiency by skipping a compilation process so that a module assembly can perform a relay operation based on a function operation order.

According to the present invention, a sequence for the function operation order is stored in a master module, an entire sequence itself is transferred between modules, and a function operation matched with the module in function information is performed to skip an unnecessary data transmission/reception process, thereby increasing an operation speed.

According to the present invention, the operation of the module assembly is specified by inputting a variable when function operation information is transferred between the modules, thereby increasing utilization of a product.

Combinations of each block of the accompanying block diagram and each step of the flowchart are constituted by firmware, software, or hardware. The combinations may be performed by an algorithm or computer program instructions. Since the algorithm or computer program instructions may be mounted on a universal computer, a special computer or a processor of other programmable digital signal processing device, the instructions performed by the computer or a processor of other programmable data processing equipment generate a means of performing functions described in each block of the block diagram or each step of the flowchart.

Since the algorithm or computer program instructions may also be stored in a computer usable or computer readable memory which may direct a computer or other programmable data processing equipment in order to implement a function in a specific scheme, the instructions stored in the computer usable or computer readable memory can also produce manufacturing items including an instruction means performing a function described in each block of the block diagram or each step in the flowchart. Since the computer program instructions can also be mounted on the computer or other programmable data processing equipment, instructions that perform the computer or other programmable data processing equipment by generating a processor executed by the computer as a series of operational steps are performed on the computer or other programmable data processing equipment can provide steps for executing the functions described in each block of the block diagram or each step in the flowchart.

Each block or each step may represent a part of a module, a segment, or a code that includes one or more executable instructions for executing a specified logical function(s). In addition, it should also be noted that in some alternative embodiments, the functions mentioned in the blocks or steps may occur out of order. For example, two successive blocks or steps illustrated may in fact be performed substantially concurrently or the blocks or steps may be sometimes performed in a reverse order according to the corresponding function.

The system according to the present invention may be implemented as a computer readable code in a computer readable recording medium. The computer readable recording medium includes all kinds of recording devices storing data which may be deciphered by a computer system. The computer readable recording medium includes magnetic storage media (e.g., a ROM, a floppy disk, a hard disk, and the like) and optical reading media (e.g., a CD-ROM, a DVD, and the like). Further, the computer readable recording media may store and execute codes which may be distributed in the computer system connected through a network and read by a computer in a distribution method.

What is claimed is:

1. A system for coding without compilation, the system comprising:
  a module assembly configured to communicate with a user terminal and a function information providing server through a network, the module assembly including a plurality of modules configured to be physically assembled with each other; and the function information providing server configured to receive function information from the plurality of modules constituting the module assembly, generate a total sequence for a function action order based on the function information, and transfer a command word to a specific module among the plurality of modules based on the function action order, wherein the command word includes at least one of unique information of a next module relayed next to a module which operates based on the function action order and function number type information which is numbered and classified based on actions to be executed in the next module, and the command word is sequentially transferred to the next module relayed based on the function action order, wherein the function action order is generated in a sequence manufacturing system based on the function information and is irrespective of an order in which the module assembly is assembled, wherein the function information providing server transfers the command word matched with the specific module based on the total sequence, and wherein the function information providing server determines whether there is an error by checking an integrity of an execution rule of the total sequence and provides assembly error information to the module assembly.

2. The system of claim 1, wherein the plurality of modules stores unique function information for each module and includes at least one function information for each module.

3. The system of claim 1, wherein the function information providing server sequentially performs wireless communication with the next module relayed by the function action order and transfers the matched command word to the next module in the total sequence.

4. The system of claim 1, wherein the function information providing server transfers the total sequence to the next module by the function action order in a lump, and the module receiving the total sequence transferred in the lump performs an action matched with a function action of the module in the total sequence and transfers the total sequence to the next module after the function action is completed.

5. The system of claim 1, further comprising:
a function result reception unit in which a module outputting a function result among the plurality of modules relayed by the function action order outputs 0 or 1 as a result and the function information providing server receives the result.

6. The system of claim 5, wherein the function information providing server transfers the command word based on the result received from the function result reception unit.

7. The system of claim 5, wherein the command word is executed at least one time based on the result received from the function result reception unit or a same action is repeated.

8. The system of claim 1, wherein the module assembly includes at least one of an input module and an output module,
the input module is at least one of an environment module, a button module, a gyroscope module, a mic module, an infrared module, a dial module, and an ultrasound module, and
the output module is at least one of an LED module, a speaker module, a display module, a motor controller module, and a motor module.

9. The system of claim 1, wherein the module assembly further includes a dial module, a button module, and a display module.

10. A system for coding without compilation, the system comprising:
a module assembly configured to communicate with a user terminal and a function information providing server through a network, the module assembly including a plurality of modules configured to be physically assembled with each other; and the function information providing server configured to receive function information from the plurality of modules constituting the module assembly, generate a total sequence for a function action order based on the function information, and transfer a command word to a specific module among the plurality of modules based on the function action order, wherein the command word includes at least one of unique information of a next module relayed next to a module which operates based on the function action order and function number type information which is numbered and classified by actions to be executed in the next module, and the command word is sequentially transferred to the next module relayed based on the function action order, wherein the function information providing server generates the total sequence matched with an assembly order of the module assembly and transfers the command word matched with the specific module based on the total sequence, wherein the function information providing server determines whether there is an error by checking an integrity of an execution rule of the total sequence and provides assembly error information to the module assembly, and wherein the function action order is an order in which the module assembly is assembled by a user.

11. A module assembly including a plurality of modules, comprising:
a master module configured to receive function information from the plurality of modules, generate a total sequence for a function action order based on the function information, and transfer a command word to a module among the plurality of modules based on the function action order; and an action module relayed based on the function action order received from the master module, wherein the command word includes at least one of unique information of a next module relayed next to a module which operates based on the function action order and function number type information which is numbered and classified based on actions to be executed in the next module, and the command word is sequentially transferred to the next module relayed based on the function action order, and wherein the command word is matched with a specific module based on the total sequence.

12. The module assembly of claim 11, wherein the master module periodically performs wireless communication with the action module and transfers a function action matched with an action module of a relay sequence number in the total sequence to the action module of the relay sequence number.

13. The module assembly of claim 11, wherein the master module sequentially transfers the total sequence to the action module.

14. The module assembly of claim 11, wherein the function action order corresponds to an order in which the module assembly is assembled by a user.

15. The module assembly of claim 11, wherein the function action order is an order set by the user in a sequence manufacturing system regardless of an order in which the module assembly is assembled.

16. The module assembly of claim 11, further comprising:
a variable module into which a variable is enabled to be input.

17. The module assembly of claim 16, wherein the variable module is a same type as the module constituting the module assembly, a card reader type, or a chip type.

18. The module assembly of claim 11, wherein the command word includes at least one of unique information of a next module relayed next to the module which operates based on the function action order and the function number type information to be executed in the next module.

19. The module assembly of claim 18, wherein function numbers are generated as different numbers so as to prevent actions in the modules from being duplicatively executed when the function information the command word is transferred.

20. The module assembly of claim 11, wherein the master module is a network module.

21. The module assembly of claim 11, wherein the module assembly includes at least one of an input module and an output module, the input module is at least one of an environment module, a button module, a gyroscope module, a mic module, an infrared module, a dial module, and an ultrasound module, and the output module is at least one of an LED module, a speaker module, a display module, a motor controller module, and a motor module.

22. The module assembly of claim 21, further comprising:
a dial module, a button module, and a display module.

* * * * *